United States Patent
Nielsen

(10) Patent No.: US 6,264,874 B1
(45) Date of Patent: Jul. 24, 2001

(54) METHOD OF CONTROLLING THE DIAMETER OF A CLEAR EXTRUDED TUBE

(75) Inventor: Niel Edwin Nielsen, LaGrange, IL (US)

(73) Assignee: Viskase Corporation, Chicago, IL (US)

( * ) Notice: Subject to any disclaimer, the term of this patent is extended or adjusted under 35 U.S.C. 154(b) by 0 days.

(21) Appl. No.: 09/296,288

(22) Filed: Apr. 22, 1999

(51) Int. Cl.[7] .......................... B29C 47/92; B29C 44/60
(52) U.S. Cl. .................. 264/408; 264/409; 264/411; 264/412; 264/40.3; 264/40.4; 264/180; 264/187; 264/559; 264/560; 264/561; 425/140
(58) Field of Search ........................ 264/408, 409, 264/410, 411, 412, 40.3, 558, 40.4, 559, 40.5, 560, 40.6, 561, 180, 187, 562, 194, 514; 425/140, 150

(56) References Cited

U.S. PATENT DOCUMENTS

| 5,352,393 | * | 10/1994 | Joseph . |
| 5,354,524 | * | 10/1994 | Sellars et al. . |
| 5,507,983 | * | 4/1996 | Sellar et al. . |
| 5,582,843 | * | 12/1996 | Sellars et al. . |
| 5,597,587 | * | 1/1997 | Nicholson et al. . |
| 5,658,525 | * | 8/1997 | Kajiwara et al. . |
| 6,004,488 | * | 12/1999 | Farias . |
| 6,033,618 | * | 3/2000 | Gord et al. . |

* cited by examiner

Primary Examiner—Jan H. Silbaugh
Assistant Examiner—Mark Eashoo
(74) Attorney, Agent, or Firm—Roger Aceto

(57) ABSTRACT

A method and apparatus for controlling the diameter of a clear extruded molten tube wherein the extruded tube contains a volume of a clear liquid and the level of the liquid is indicative of the tube diameter so the level rises as the tube diameter decreases. A light beam passing through the tube is refracted from a straight line path when the liquid level rises above the level of the beam. The refracting of the beam in turn triggers the introduction of air into the extruded tube to increase the diameter of the extruded, molten tube.

7 Claims, 2 Drawing Sheets

METHOD OF CONTROLLING THE DIAMETER OF A CLEAR EXTRUDED TUBE

TECHNICAL FIELD

The present invention relates to the production of a non derivitized cellulose food casing wherein a cellulose solution is extruded as a tube and the solvent then is removed for precipitating or regenerating the cellulose. In particular, the present invention relates to apparatus and method for controlling the diameter of the tube as it is being extruded and prior to regeneration.

BACKGROUND OF THE INVENTION

The production and use of cellulose food casings for the manufacture of frankfurters and the like is well known in the art. Automatic stuffing machines are available which stuff an uncooked meat or poultry emulsion into a long tubular casing while simultaneously forming the stuffed casing into links. The result is a long string of sausage links up to 40 to 50 meters long or longer.

At present, the only commercial process for manufacturing a cellulose casing for frankfurters involves the well-known viscose process. In the viscose process, a natural cellulose is contacted with a strong base to produce alkali cellulose. The alkali cellulose then is reacted with other chemicals to produce cellulose xanthate, a soluble cellulose derivative. The xanthate is dissolved in an aqueous solution of sodium hydroxide and the solution is extruded as a tube upwardly into an acid bath. The acid reacts with the xanthate to regenerate the cellulose in the form of a hydrated cellulose gel. Thus, with the viscose process, there is a first chemical reaction to create a soluble cellulose derivative and a second chemical reaction to regenerate the cellulose from the derivative. The gel then is washed, plasticized with a polyol such as glycerin and then is dried from a moisture content of 200% or more to a moisture content of less than 15% and preferably to about 5% to 10% based on the weight of dry cellulose in the casing or "bone dry gauge" (BDG).

Drying sets the properties of the tubular cellulose casing. Typically the dry casing then is passed through a steam chamber to remoisturized the cellulose to a moisture level of about 10 to 25% BDG. At this level, the casing is sufficiently pliable to permit further handling without damage.

More recently, a solution process has been adapted to the production of cellulose casing. Reference is made to U.S. Pat. Nos. 5,277,857 and 5,451,364 for details of the process. In brief, in the solution process the natural cellulose undergoes a direct dissolution by a cellulose solvent such as N-methyl-morpholine-N-oxide (NMMO). The resulting cellulose solution is thermoplastic in that it is solid at room temperature. The solution is extruded at about 100° C. as a tube downwardly into a regenerating bath containing a non solvent for the cellulose such as water. In the bath the solvent is extracted from the extruded tube to precipitate or regenerate the cellulose as a hydrated cellulose gel. Thus, in the solution process there is no chemical reaction and the cellulose is non derivitized. For purposes of the present invention, "non derivitized" cellulose means a cellulose which has not been subjected to covalent bonding with a solvent or reagent but which has been dissolved by association with a solvent or reagent through Van der Waals forces and/or hydrogen bonding. As in the viscose process, the tube of cellulose gel is washed (to remove residual solvent), dried to form a cellulose film and set properties and then the dried film is remoisturized.

The course of extrusion is downwardly through an air gap defined as the distance from the outlet of the extrusion die to the surface of the liquid in the regenerating bath. As disclosed in U.S. Pat. No. 5,277,857, there is a mandrel which depends from the extrusion die and extends to just below the level of liquid in the regenerating bath. This mandrel, which is disposed inside the extruded tube, includes a narrow stem and a lower portion that is larger in diameter than the stem. The enlarged lower end of the mandrel is a sizing portion as it functions to size the extruded tube by diametrically expanding it.

The extruded tube is highly viscous (3,000,000 to 11,000,000 centipoises) and will stick to the mandrel upon contact. To prevent this, a lubricating liquid, usually a dilute solution of the solvent, is introduced into the extruded tube through ports in the mandrel. Such an arrangement is disclosed in U.S. Pat. Nos. 5,759,478 and 5,766,540. As shown in these patents, the liquid pools around the stem of the mandrel just above the enlarged lower portion and forms an internal bath. The purpose of the internal bath is to start the extraction of solvent at the inner surface of the extruded tube and to facilitate the passage of the extruded tube over the enlarged lower portion of the mandrel. Lubrication is provided as liquid from the internal bath is drawn down and over the surface of the enlarged portion of the mandrel. The liquid drawn from the internal bath is continuously replaced at a rate which maintains the volume of the internal bath above the mandrel sizing portion relatively constant.

U.S. Pat. No. 5,451,364 discloses that casing properties are improved by increasing the length of the air gap to 12 inches (30 cm). U.S. Pat. No. 5,766,540 discloses use of even longer air gaps and suggests that passing the extrusion through an air gap of 50 cm or more may further improve properties.

However, an air gap length over 30 cm and up to 50 cm or more presents several problems both on start up of the extrusion operation and during continuous extrusion. The problems on start up are addressed by U.S. Pat. No. 5,766,540.

The extruded tube necks down as it is drawn through the air gap. Necking of the extruded tube is accommodated to some extent by having the mandrel stem a smaller diameter than the lower portion which sizes the tubing. Thus, as the extruded tube necks down it has clearance to avoid contacting the stem of the mandrel. However, it has been found that the diameter of the extruded tube in the region of the air gap decreases over time to the point where the tube can make contact with the stem of the mandrel. Such contact is highly undesirable because upon such contact the extruded tube will adhere to the mandrel stem and immediately interrupt the continuous extrusion operation.

There may be several reasons for the decrease in the diameter of the extruded tube over time. For example, one possible reason is that the volume of air within the extruded tube decreases over time due to leaks in the system that allows gases to pass up through the die. Another possible cause is that gases within the volume of the extruded tube are drawn downward by friction so as to pass from the volume above the enlarged portion of the mandrel to the volume below the enlarged portion. This is described in more detail in U.S. Pat. No. 5,759,478. The loss of gas volume also may be due to gradual dissolving of gasses in the liquid of the internal bath. For whatever reason, the excessive necking of the extruded tube is undesirable particularly where a long air gap is used for the reason noted above.

It has been found that the pressure within the extruded tube remains relatively constant as the tube diameter changes. Thus, the internal pressure is not indicative of the tube diameter. Accordingly, it is not practical to adjust the tube diameter by monitoring the air pressure within the extruded tube and then introducing air to expand the tube when the pressure falls below a predetermined level. Also, the extruded tube, as it exits the die, is molten. Accordingly, attempting to control the diameter by introducing air under pressure into the extruded tube will cause the tube diameter to expand. While such diametrical expansion is desirable in order to reestablish a clearance from the mandrel, the expansion increases the tube volume which again lowers the internal pressure prompting a further introduction air. The process would repeat until the extruded tube is excessively ballooned or blows out.

However, a narrowing or collapse of the extruded tube decreases the volume within the extruded tube and the level of the internal bath above the mandrel sizing portion rises. Thus, the level of the internal bath is indicative of the diameter of the extruded tube. In a preferred method of operation, the level of the internal bath is above the level of the regenerating bath. Raising the level of the internal bath, as would occur as the extruded tube narrows or necks down, causes other problems (not discussed herein) and is to be avoided.

As noted above, a rise in the level of the internal bath is indicative of a narrowing of the diameter of the extruded tube in the area of the air gap. Accordingly, the liquid level can be used to trigger a response to increase the tube diameter. However, due to the small clearance already existing between the mandrel shaft and the extruded tube surrounding the shaft, the insertion of level indicators into the tube is not practical. Also, both the extruded tube and internal bath are relatively clear so it is difficult for an optical sensor to distinguish the level of the internal bath based on a change in color or opacity from the clear tubing as the level of the internal bath rises.

Accordingly, while it is desirable to automate the control of the diameter of the extruded tube, it is due to the problems noted above that heretofore the adjustment of the diameter and bath level has been manual. In this respect, the skill of the operator was relied upon to track the level of liquid in the internal bath. When the diameter of the extruded tube decreased below and acceptable limit, the operator triggered a solenoid for introducing one or more pulses of air into the extruded tube. This expanded the extruded tube which in turn dropped the level of the internal bath. On the rarer occasion when the diameter of the extended tube increased above an acceptable limit, the operator would bleed air from the extended tube to decrease its diameter.

Accordingly, one object of the present invention is to provide an automated method and apparatus for maintaining the extruded tube in the area between the extrusion die and the enlarged lower end of the mandrel at a desired diameter.

Another object is to provide a method and apparatus that is not pressure responsive for adjusting the air volume within the extruded tube in order to prevent excessive necking of the tube as it is drawn through an air gap.

A further object is to provide a method and apparatus for adjusting the diameter of the extruded tube in response to a change in the level of a pool of liquid within the extruded tube.

SUMMARY OF THE INVENTION

The method and apparatus of the present invention provide for controlling the diameter of the extruded tube in response to change in the level of the internal bath caused by a decrease in the tube diameter. This is accomplished by a laser, other light source or other suitable focused emitter or collimator located at one side of the extruded tube and arranged to direct a refractable beam through the extruded tube. Since there is a mandrel stem axially located within the extruded tube, the emitter must be off center so the beam is not blocked by the mandrel. The emitter is located so it directs its beam through the casing at the desired level for the internal bath.

A receiver is located on the opposite side of the casing at the same level as the emitter. In the case where the internal bath is below a predetermined level, the beam from the emitter can pass straight through the walls of the extruded tube to strike the receiver. So long as the internal bath is at a low level, the receiver is illuminated by the beam and the extruded tube is not excessively necked down. However, should the internal bath level rise above the level of the beam, the extruded tube and bath liquid together form a cylindrical lens. Moreover, the beam, being offset from the axis of the extruded tube, is refracted by this lens and deflected away from the receiver. When the receiver loses the beam, it triggers a solenoid to open an air valve for admitting low pressure air into the extruded tube. This expands the tube and causes the level of the internal bath to fall. When the liquid level falls below the level of the beam, the lens effect is eliminated and the beam once again passes straight through the tube and illuminates the receiver. This causes the receiver to turn off the solenoid and stop the air flow.

It should be appreciated that the refraction of the beam as it passes through the wall of the extruded tube and the internal bath occurs because the emitter is offset from a plane passing through the mandrel axis. Thus, the fact that the emitter must be offset to avoid blocking of the beam by the mandrel stem allows the lens effect to occur so the apparatus can recognize the level of the internal bath even though the extruded tube and bath liquid are both transparent to the beam.

Accordingly, the present invention is characterized in one aspect thereof by a method of controlling the diameter of a transparent extruded molten tube of a non derivitized cellulose being extruded downwardly about a mandrel having a stem that terminates in an enlarged lower portion which is larger in diameter than the stem portion for sizing the tube and the tube containing a volume of a clear liquid in an internal bath around the mandrel stem adjacent the mandrel sizing portion, comprising the steps of:

a) passing a refractable beam horizontally through the tube at a selected level above the mandrel lower portion, the beam being in a plane offset from the mandrel stem to prevent blockage of the beam's passage and the beam passing in a straight line path through the tube when the clear liquid of the internal bath is below the selected level;

b) refracting the beam from its straight line path when the clear liquid in the internal bath raises to a level above the selected level of the beam wherein the tube and clear liquid together define a cylindrical lens means that causes the refracting of the beam;

c) introducing air under pressure into the interior of the tube responsive to the refracting of the beam to increase the diameter of the tube in the region of the air gap thereby lowering the level of the internal bath below the selected level of the beam; and d) terminating the introduction of air into the tube responsive to the straight line passage of the beam through the tube.

The present invention may be characterized in another aspect thereof by means for controlling the diameter of a transparent extruded molten tube of non derivitized cellulose comprising:

a) an annular die for extruding a clear molten tube of non derivitized cellulose;

b) a mandrel depending from the die including a stem and an enlarged lower portion having a diameter larger than the stem so as to provide a mandrel surface contacting the inner surface of the extruded tube for sizing the extruded tube, the mandrel including means for introducing a clear non solvent liquid into the interior of the extruded tube which forms a pool around the mandrel stem and above the enlarged lower portion;

c) an emitter arranged at one side of the extruded tube for directing an emitted beam in a straight line horizontal path through the extruded tube at a selected level, the emitter being offset from a plane passing through the axis of the mandrel stem to avoid blockage of the passage of the beam;

d) the extruded tube and the clear non solvent liquid in the pool forming a lens means for refracting the beam from its straight line path when the level of the pool of clear liquid reaches the selected level; and e) a sensor on an opposite side of the extruded tube from the emitter for detecting the presence or absence of the refracted beam and the sensor acting responsive to the refraction of the beam for introducing air under pressure into the interior of the extruded tube thereby increasing the tube diameter and lowering the level of the pool of clear liquid.

DETAILED DESCRIPTION OF THE INVENTION

Figure 1:
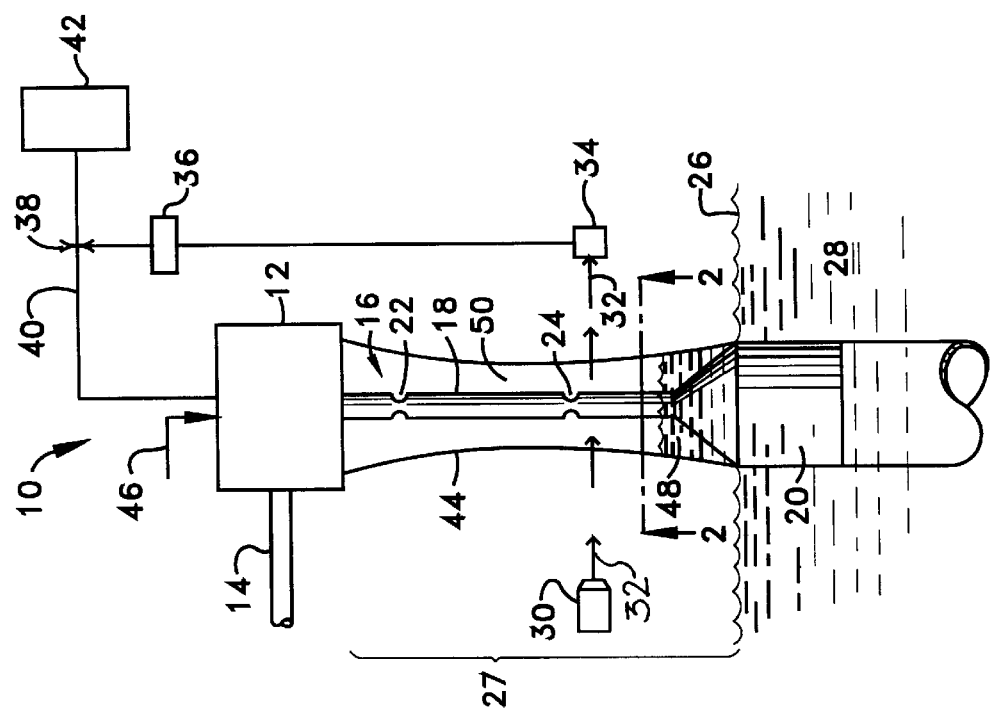
FIG. 1 is an elevation view showing a portion of the apparatus of the present invention and control components with the internal bath at a low level.

Referring to the drawings, FIG. 1 shows the apparatus and control components generally indicated at 10. The extrusion apparatus includes a die 12 arranged for downwardly extruding a tube composed of a thermoplastic non derivitized cellulose solution. The die receives the cellulose solution from any appropriate source (not shown) through an inlet 14. Methods and apparatus for making a cellulose solution are well known in the art and form no part of the present invention. A suitable method and apparatus is described generally, for example, in U.S. Pat. No. 5,094,690. The cellulose solution itself also is well known as noted above and generally is a highly viscus (3,000,000 to 11,000,000 centipoises), clear thermoplastic material having a melting point of about 70–110° C. and comprising generally 10 to 20 wt. % cellulose, 70 to 80 wt. % NMMO cellulose solvent and 5 to 15 wt. % water.

Depending from die 12 is a mandrel 16. A preferred mandrel structure is described in more detail in U.S. Pat. Nos. 5,759,478 and 5,766,540. Briefly, the mandrel includes a stem 18 which terminates in a sizing portion 20 which is larger in diameter than the stem. The mandrel stem 18 has outlet ports 22 and 24. Internal conduits (not shown) are arranged for conveying air and a clear internal bath liquid (described herein below) to the outlet ports 22, 24 respectively. Another conduit (not shown) in the mandrel is arranged for drawing up through the mandrel, a portion of the liquid contained in the volume which is within the tube and below the sizing portion 20 of the mandrel.

The die 12 is supported above the surface 26 of a regenerating bath 28 of a nonsolvent liquid.

For purposes of the present invention "non solvent" means a liquid which is not a cellulose solvent. A dilute aqueous solution of NMMO or a poly(ethylene oxide) solution is a preferred non solvent liquid.

With the arrangement as shown, mandrel 16 spans an air gap 27 between the die and the regenerating bath 28 wherein the lower portion 20 of the mandrel is mostly disposed below the level 26 of the regenerating bath.

Figure 2:
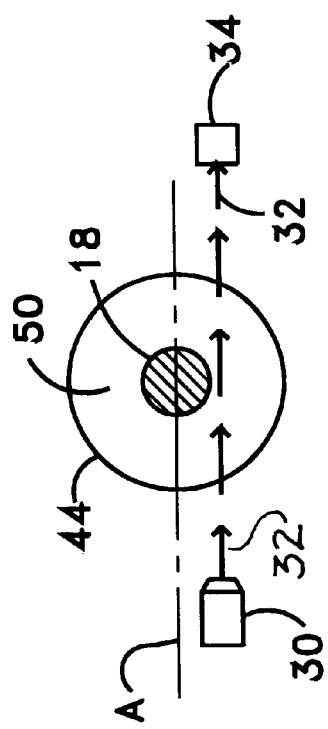
FIG. 2 is a view on an enlarged scale taken along lines 2—2 of FIG. 1.

Located between surface of the regenerating bath and the outlet ports 24 for the internal bath liquid, is a device such as a laser, a light source, collimator or other emitting device 30 capable of emitting a generally horizontal beam 32. As shown in FIG. 2, the emitter 30 is located so it is offset from a vertical plane "A" passing through the axis of mandrel stem 18. The amount of this offset is sufficient to prevent, the mandrel stem 18 from blocking the passage of the beam. The level of beam 32 is selected to be representative of a minimum diameter of the extruded tube as set out further hereinbelow.

On the opposite side of the mandrel from the emitter 30, is a receiver or sensor 34, for detecting the presence or absence of the beam 32. Thus, the sensor 34 is arranged on the same level as the emitter 30 so as to be illuminated by the beam 32.

As shown in FIG. 1, the sensor 34 is connected to an actuator 36 for opening and closing a valve 38. The actuator 36 can be electrically operated, such as a solenoid, or pneumatic.

The valve 38 is in an air line 40 extending from a source 42 of low pressure air (25.4 to 38 mm of water). The air line 40 connects to a conduit (not shown) within the mandrel stem that terminates in outlet ports 22.

In operation, and with reference to FIG. 1, the thermoplastic cellulose solution or "dope" is pumped to the die 12 and extruded as a seamless tube 44. The extruded tube 44, which is molten, passes over the sizing portion 20 of the mandrel and into the non solvent regenerating bath 28. The sizing portion 20 serves to diametrically expand the extruded tube 44. In the bath, solvent is extracted from the extruded tube to regenerate the cellulose and form a solidified cellulose tube. Preferably, the surface of the mandrel sizing portion 20 is a hydrophobic material such as tetrafluoroethylene.

It is known that the molten extruded tube 44 will adhere to the mandrel. Accordingly, a liquid is introduced into the interior of the extruded tube through an inlet line 46. This line is connected to a conduit (not shown) within the mandrel stem 18 that terminates in outlet ports 24. Preferably, the liquid is a dilute NMMO solution or a solvent-free solution of poly(ethylene oxide). As is discussed in U.S. Pat. No. 5,277,857 the liquid introduced into the extruded tube has two functions. It acts to lubricate the passage of the extruded tube over the mandrel and also begins the extraction of solvent to initiate regeneration of the cellulose at the inner surface of the extruded tube.

The liquid that is introduced into the extruded tube from ports 24 forms a pool or internal bath 48 above the sizing portion 20 of the mandrel. During operation, the introduced liquid continuously passes from the internal bath 48 down between the extruded tube and the surface of the mandrel sizing portion 20. This forms a thin film of lubricant between the extruded tube and the mandrel sizing portion. For example, in a typical operation wherein the diameter of the extruded tube is about 15.74 mm and the diameter of the mandrel sizing portion 20 is about 25.4 mm, liquid is added to the internal bath at a rate of about 100 to 150 ml/min depending upon the extrusion speed and is drawn from the internal bath at substantially the same rate.

The distance of the air gap 27 from the extrusion die 12 to the level 26 of the regenerating bath can be 30 to 50 cm or more. Consequently, the extruded tube tends to neck down, as shown, as it is drawn through the air gap and over the mandrel.

As noted above, the extruded tube will adhere if it touches an unlubricated portion of the mandrel. Accordingly, one reason why the stem 18 of the mandrel has a smaller diameter than the mandrel sizing portions 20 is to provide a clearance space 50 between the mandrel stem and the extruded tube.

During the course of extrusion, it has been noted that the diameter of the extruded tube in the region of air gap 27 decreases over time. This collapses or necks the tube to the point where the extruded tube may make contact with the mandrel stem 18 above the outlet ports 24. If this occurs, the tube will adhere to the stem and interrupt the extrusion operation. Accordingly, to maintain the tube diameter greater than a safe minimum diameter, air is periodically introduced into the clearance space 50 to increase the diameter of the extruded tube and prevent such contact. Heretofore, this was done manually and the skill of an operator was relied upon to observe when the necking became excessive and to introduce an amount of air sufficient to reestablish safe operating parameters.

As discussed above, monitoring the air pressure in the clearance space 50 and then adjusting the tube diameter in responsive to changes in the air pressure is not an effective method of maintaining a minimum diameter of the extruded tube. However, as the extruded tube necks down, the decrease in the diameter of the extruded tube causes the level of the internal bath to rise. Thus, the rise of the level of the internal bath represents a decrease in the diameter of the extruded tube and is an indication that excessive necking is occurring. In this way, the internal bath level is an indirect indicator of the diameter of the extruded tube.

Figure 3:
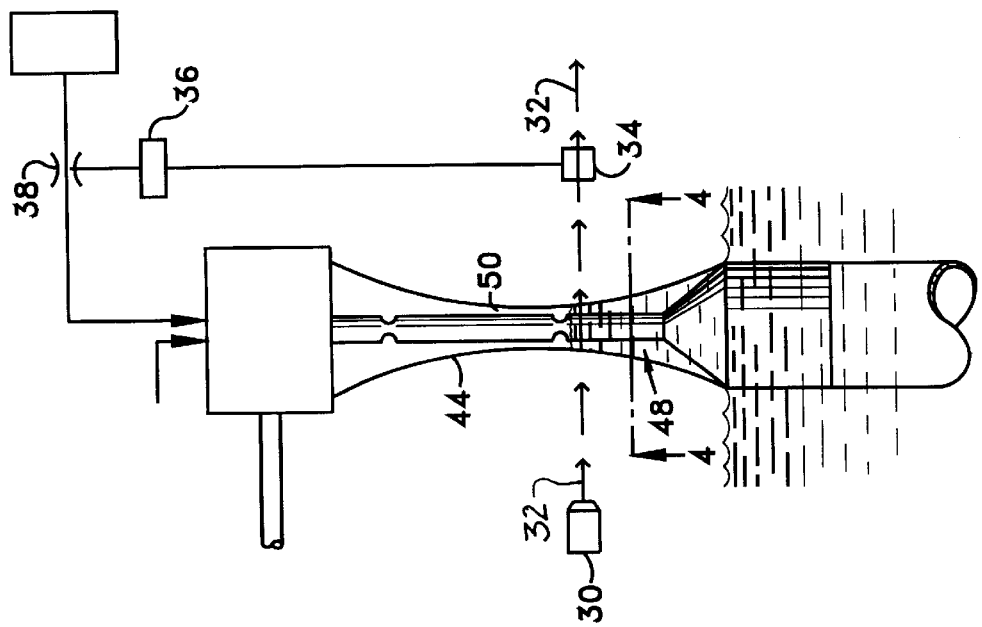
FIG. 3 is a view similar to FIG. 1 only showing the internal bath at a higher level.
Figure 4:
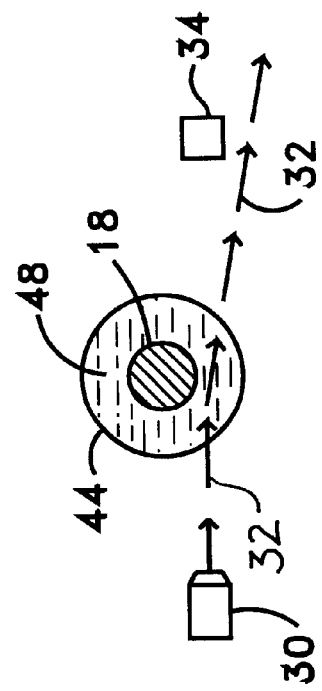
FIG. 4 is a view on an enlarged scale taken along line 4—4 of FIG. 3.

As shown in FIGS. 1 and 2, the level of the internal bath is below the beam 32 so the beam from the emitter 30 passes through the clear extruded tube 44 and illuminates the sensor 34. At this point, the diameter of the extruded tube is sufficient to keep it from contacting the mandrel stem 18 (FIG. 1). However, should the tube diameter decrease, there is a decrease in the volume of the clearance space 50 between the mandrel stem and extruded tube and the level of the internal bath 48 will rise in this volume. Eventually the level may rise to the level of the beam or above, as shown in FIGS. 3 and 4, which is the level selected to represent a safe minimum operating diameter.

As noted above, the liquid of the internal bath is clear so the beam can pass through the bath. Thus, the bath itself, does not interrupt the beam. However, as shown in FIG. 4, the tubular extruded tube 44 and the internal bath 48 together provide a cylindrical lens. The lens causes the beam 32 (which is not normal to the extruded tube due to the offset position of the emitter) to refract as it passes through the inner bath liquid thereby, missing the sensor 34 (FIGS. 3 and 4). The sensor, no longer illuminated by the beam, signals the solenoid 36 to open valve 38 for admitting air into the extruded tube (FIG. 3). The introduction of air diametrically expands the extruded tube. This increases the volume of the clearance space 50 and the level of the internal bath 48 drops below the beam. When this happens, the beam again passes straight through the tube to illuminate the sensor. The illuminated sensor then signals the solenoid to close the air valve 38 and terminate the introduction of air.

Thus, the refraction of the beam when the level of the internal bath reaches a given height, provides an on/off indicator for introducing air into the extruded tube to restore the diameter of the extruded tube. In this fashion, the extruded tube can be kept larger than a diameter sufficient to avoid disruption of the extrusion process as would occur, for example, if the extruded tube came into contact with the stem of the mandrel. Moreover, the adjustment is done independently of the pressure within the extruded tube. Further, use of the apparatus as described provides a non invasive method for altering the tube diameter in that there is no physical contact made with the extruded tube itself.

Thus, it should be appreciated that the present invention accomplished its intended objects in providing a method and apparatus for maintaining a clear, extruded tube of non derivitized cellulose at a desired diameter by adjusting the internal volume of the extruded tube to prevent excessive necking and making such adjustments in internal volume responsive to a change in the level of a pool of clear liquid maintained within the extruded tube.

While a preferred embodiment has been described, it should be appreciated that modification can be made without changing the spirit and scope of the invention as claimed. For example, the position of sensor 34 can be changed so it normally is not illuminated by the beam 32 and instead triggers the solenoid 36 only when illuminated by the refracted beam. Also, while not shown, a second laser and sensor can be positioned at a lower level and arranged to bleed air from within the extruded tube should the diameter of the extruded tube increase beyond a desired maximum.

Having described the invention detail, what is claimed as new is:

1. In a process of extruding a transparent molten tube of nonderivatized cellulose downwardly through an air gap and about a mandrel having a stem terminating in an enlarged lower portion for sizing the tube and the tube containing an internal bath of a clear liquid around the mandrel stem adjacent the enlarged lower portion, a method for controlling the diameter of the tube in the region of the air gap comprising:

a) passing a refractable beam horizontally through the extruded tube at a selected level above the enlarged lower portion of the mandrel, the beam being in a plane offset from the mandrel stem to prevent blockage of the beam's passage and the beam passing in a straight line path through the extruded tube when the internal bath of clear liquid is below the level of the beam;

b) refracting the beam from its straight line path when the internal bath of clear liquid rises to a level above the selected level of the beam responsive to a decrease in the diameter of the extruded tube wherein the extruded tube and clear liquid of the internal bath together define a cylindrical lens means that causes said refracting of the beam;

c) introducing air under pressure into the interior of the extruded tube responsive to the refracting of the beam to increase the diameter of the extruded tube in the region of the air gap thereby lowering the level of the internal bath to a level below the selected level of the beam; and d) terminating the introduction of air into the extruded tube responsive to the straight line passage of the beam through the extruded tube.

2. A method as in claim 1 including maintaining the internal bath of clear liquid at a substantially constant volume.

3. A method as in claim 1 including locating a beam receiver at said selected level and in the straight line path of said beam for illuminating the receiver with the beam wherein said illuminating of the receiver prevents the introducing of air into the interior of the extruded tube and the refracting of the beam away from the receiver causes the introducing of air into the extruded tube.

4. A method as in claim 1 wherein said step of introducing air is responsive to the illuminating of a receiver by the refracted beam.

5. A method as in claim 1 including locating a receiver at the selected level in a position which is out of the straight line path of the beam and in the path of the beam upon the refracting thereof wherein illuminating the receiver by the refracted beam activates the receiver for introducing air into the extruded tube.

6. A method as in claim 1 wherein the refractable beam is a laser beam.

7. A method as in claim 1 where the refractable beam is a collimated light beam.

* * * * *